US008820295B2

(12) United States Patent
Coldren

(10) Patent No.: US 8,820,295 B2
(45) Date of Patent: Sep. 2, 2014

(54) SINGLE ACTUATOR FUEL INJECTOR FOR DUAL FUELS

(75) Inventor: Dana R. Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 361 days.

(21) Appl. No.: 13/250,346

(22) Filed: Sep. 30, 2011

(65) Prior Publication Data
US 2013/0081593 A1 Apr. 4, 2013

(51) Int. Cl.
F02M 43/00 (2006.01)

(52) U.S. Cl.
USPC .................... 123/304; 239/584; 239/585.1

(58) Field of Classification Search
USPC ............ 123/304, 27 GE, 525–527, 575–578; 239/407, 584–585.5
See application file for complete search history.

(56) References Cited

U.S. PATENT DOCUMENTS

| 6,073,862 | A | 6/2000 | Touchette et al. |
| 6,202,601 | B1 | 3/2001 | Ouellette et al. |
| 6,279,843 | B1 | 8/2001 | Coldren et al. |
| 6,336,598 | B1 | 1/2002 | Touchette et al. |
| 7,305,971 | B2 | 12/2007 | Fujii |
| 7,373,931 | B2 | 5/2008 | Lennox et al. |
| 8,322,325 | B2 * | 12/2012 | Rogak et al. ............ 123/304 |
| 2005/0173563 | A1 | 8/2005 | Coldren et al. |
| 2006/0086825 | A1 | 4/2006 | Date et al. |
| 2011/0108631 | A1 | 5/2011 | Mumford et al. |
| 2011/0147495 | A1 | 6/2011 | Manubolu et al. |
| 2012/0285417 | A1 * | 11/2012 | Kim et al. ............... 123/299 |

FOREIGN PATENT DOCUMENTS

| JP | 2000356169 | 12/2000 |
| JP | 2003056425 | 2/2003 |
| WO | 2008000095 | 1/2008 |

* cited by examiner

Primary Examiner — Thomas Moulis
Assistant Examiner — Joseph Dallo
(74) Attorney, Agent, or Firm — Miller, Matthias & Hull

(57) ABSTRACT

Fuel injectors are disclosed that are capable of simultaneously delivering liquid and gaseous fuels to the combustion chamber of a compression ignition engine. For example, fuel injectors are disclosed that can deliver liquid diesel fuel, as a pilot liquid, along with a gaseous fuel, such as natural gas or other available fuels that are gases at atmospheric pressure and ambient temperature. The fuels are delivered to the needle control valve cavity sequentially via separate passageways. The delivery of the pressurized liquid fuel is actuated by the single actuator that is provided for each fuel injector. The actuator may be of a solenoid type or of a piezoelectric type or other suitable actuator as will be apparent to those skilled in the art. A liquid fuel check valve, in combination with the actuator, controls the delivery of the pilot liquid fuel to the needle control valve cavity.

20 Claims, 3 Drawing Sheets

SINGLE ACTUATOR FUEL INJECTOR FOR DUAL FUELS

TECHNICAL FIELD

This disclosure relates to an apparatus and method for delivering two fuels to a direct injection internal combustion engine. More specifically, this disclosure relates to a fuel injector with a single actuator that can deliver a liquid and a gaseous fuel through a nozzle outlet to a combustion chamber.

BACKGROUND

Diesel engines are the most popular type of compression ignition engines. Diesel engines introduce fuel directly into the combustion chamber. Diesel engines are very efficient because they provide high compression ratios without knocking, which is the premature detonation of the fuel mixture inside the combustion chamber. Because diesel engines introduce fuel directly into the combustion chamber, the fuel injection pressure must be greater than the pressure inside the combustion chamber. For liquid fuels such as diesel, the pressure must be significantly higher so that the fuel is atomized for efficient combustion.

Diesel engines are favored by industry because of their excellent combination of power, performance, efficiency and reliability. For example, diesel engines are generally much less expensive to operate compared to gasoline fueled, spark-ignited engines, especially in commercial applications where large quantities of fuel are used. However, one disadvantage of diesel engines is pollution, such as particulate matter (soot) and NOx gases, which are subject to increasingly stringent regulations that require NOx emissions to be progressively reduced over time. To comply with these increasingly stringent regulations, engine manufacturers are developing catalytic converters and other aftertreatment devices to remove pollutants from diesel exhaust streams.

Improvements to diesel fuels are also being introduced to reduce the amount of sulfur in diesel fuel, to prevent sulfur from de-activating the catalysts of catalytic converters and to reduce air pollution. Research is also being conducted to improve combustion efficiency to reduce engine emissions, for example by making refinements to engine control strategies. However, most of these approaches add to the capital cost of the engine and/or the operating costs.

Other recent developments have been directed to substituting some of the diesel fuel with cleaner burning gaseous fuels such as, for example, natural gas, pure methane, butane, propane, hydrogen, and blends thereof. Since gaseous fuels typically do not auto-ignite at the same temperature and pressure as diesel fuel, a small amount of pilot diesel fuel can be introduced into the combustion chamber to auto-ignite and trigger the ignition of the gaseous fuel. Another approach for consuming gaseous fuel on board a vehicle involves introducing the gaseous fuel into the engine's intake air manifold at relatively low pressures. However, this approach has been unable to match the performance and efficiency of currently available diesel engines, particularly at high gas:diesel ratios. Thus, the simultaneous delivery of both diesel fuel and gaseous fuel to combustion chambers, with the diesel acting as a pilot fuel, would be desirable.

However, one problem associated with delivering two different fuels for injection directly into the combustion chambers of an internal combustion engine is the lack of physical space for two fuel injectors per cylinder and space near the fuel injectors to provide two fuel rails in addition to drain lines for taking away fuel that may leak from the injectors. The need for two actuators per cylinder adds to the space problem. Accordingly, there is a need to provide a more space efficient design for injecting two different fuels into a combustion chamber without adding to the complexity of the piping to and from the fuel injectors.

SUMMARY OF THE DISCLOSURE

In response to the above problems, a fuel injector is disclosed which includes an injector body that defines a liquid fuel inlet, a gaseous fuel inlet and a nozzle outlet. The fuel injector also includes a needle control valve disposed within a cavity formed in the injector body. The needle control valve includes a proximal end and a distal end. The distal end is disposed adjacent to the nozzle outlet and includes a closing surface. The cavity includes a valve seat for releasably engaging the closing surface and for releasably sealing the nozzle outlet. The fuel injector also includes a liquid fuel control valve disposed within the injector body and in selective communication with the liquid fuel inlet and the cavity. The fuel injector also includes an actuator for moving the liquid fuel control valve between an open position where the liquid fuel control valve provides communication between the liquid fuel inlet and the cavity in a closed position where the liquid fuel control valve isolates the liquid fuel inlet from the cavity. The gaseous fuel inlet is in direct communication with the cavity.

Another fuel injector is disclosed which includes an injector body that defines a liquid fuel inlet, a gaseous fuel inlet, a drain, a nozzle outlet, a liquid fuel control valve cavity, a liquid fuel passage, a gaseous fuel passage and a needle control valve cavity. The fuel injector also includes a liquid fuel control valve disposed within the liquid fuel control valve cavity and that is in selective communication with the liquid fuel inlet, the liquid fuel passage and the drain. The liquid fuel control valve is movable between a closed position where the liquid fuel inlet and liquid fuel passage are isolated from the liquid fuel control valve cavity and the drain is in communication with the liquid fuel control valve cavity. The liquid fuel control valve is also movable to an open position where the liquid fuel inlet is in communication with the liquid fuel passage through the liquid fuel control valve cavity and the drain is isolated from the liquid fuel control valve cavity. The liquid fuel control valve cavity is connected to the needle control valve cavity by the liquid fuel passage. The liquid fuel passage includes a liquid fuel check valve that closes the liquid fuel passage when the liquid fuel control valve is in the closed position. The gaseous fuel inlet is connected to the needle control valve cavity by a gaseous fuel passage. The gaseous fuel passage includes a gaseous fuel check valve that closes the gaseous fuel passage when the liquid fuel control valve is in the closed position. The fuel injector also includes a needle control valve disposed within the needle control valve cavity. The needle control valve includes a distal end disposed adjacent to the nozzle outlet and a proximal end. The distal end includes a closing surface and the needle control valve cavity includes a valve seat for releasably engaging the closing surface for releasably sealing the nozzle outlet. The fuel injector also includes a single actuator for moving the liquid fuel control valve between the open and closed positions.

A method is also disclosed for delivering a liquid fuel and a gaseous fuel to a combustion chamber using a single fuel injector with a single actuator. The method includes providing a fuel injector that includes an injector body that defines a liquid fuel inlet, a gaseous fuel inlet and a nozzle outlet. The fuel injector further includes a needle control valve disposed within the cavity formed in the injector body. The cavity includes a nozzle outlet at one end and a biasing chamber at the other end with the needle control valve disposed therebetween. The needle control valve includes closing surface disposed at a distal end of the needle control valve that faces the nozzle outlet for releasably sealing the nozzle outlet. The needle control valve also includes a proximal end that faces the biasing chamber. The fuel injector further includes a liquid fuel control valve disposed within the injector body and that is in selective communication with the liquid fuel inlet and the cavity by way of the liquid fuel passage. The liquid fuel passage is also connected to a liquid fuel flow passage. The liquid fuel flow passage is in communication with the biasing chamber. The fuel injector also includes an actuator for moving the liquid fuel control valve between an open position where the liquid fuel control valve provides communication between the liquid fuel inlet and the liquid fuel passage as well as the liquid fuel flow passage, and a closed position where the liquid fuel control valve isolates the liquid fuel inlet from the liquid fuel passage and the liquid fuel flow passage. The gaseous fuel inlet is in communication with the cavity through a gaseous fuel passage. The liquid fuel passage includes a liquid fuel check valve that closes the liquid fuel passage when the liquid fuel control valve is closed thereby providing communication between the liquid fuel passage, the liquid fuel flow passage and the drain. The gaseous fuel passage includes a gaseous fuel check valve that closes when a pressure in a cavity drops below a predetermined level after the liquid fuel control valve is closed. The method includes delivering liquid fuel past the liquid fuel control valve, past the liquid fuel check valve into the cavity and delivering gaseous fuel past the gaseous fuel check valve and to the cavity when the liquid fuel control valve is in the open position. The method further includes actuating an actuator to close the liquid fuel control valve thereby providing communication between the drain and both the liquid fuel passage and liquid fuel flow passage thereby closing the liquid fuel check valve, reducing pressure in the biasing chamber thereby lifting the closing surface of the needle control valve off of the nozzle outlet and closing the gaseous fuel check valve.

In any one or more of the embodiments described above, the cavity may include an upper chamber connected to the gaseous fuel inlet and a lower chamber in communication with the liquid fuel control valve. The lower chamber may be disposed between the nozzle outlet and the upper chamber.

In any one or more of the embodiments described above, the liquid fuel may be supplied at a higher pressure than the gaseous fuel.

In any one or more of the embodiments described above, the liquid and gaseous fuels may be isolated from one another until they reach the cavity.

In any one or more of the embodiments described above, the actuator may be a solenoid assembly or the actuator may be a piezoelectric actuator.

In any one or more of the embodiments described above, the liquid fuel control passage may connect the liquid fuel control valve to the cavity and the liquid fuel passage may also be connected to a liquid fuel flow passage. The cavity may extend between the nozzle outlet and a biasing chamber with the distal end of the needle control valve facing the nozzle outlet and the proximal end of the needle control valve facing the biasing chamber. The biasing chamber may be in communication with the liquid fuel flow passage for biasing the needle control valve towards the nozzle outlet. In a further refinement of this concept, the biasing chamber may also accommodate a needle control valve spring that biases the needle control valve towards the nozzle outlet.

In any one or more of the embodiments described above, the fuel injector may further include a gaseous fuel passage that connects the gaseous fuel inlet to the cavity. The liquid fuel control valve may also be connected to a liquid fuel bypass passage. The liquid fuel bypass passage may connect the liquid fuel control valve to the gaseous fuel passage with a bypass check valve disposed in the liquid fuel bypass passage. The bypass check valve may be biased towards a closed position that isolates the liquid fuel control valve from the gaseous fuel passage when there is sufficient pressure in the gaseous fuel passage. As a result, if a pressure in the gaseous fuel passage drops below a predetermined level, the bypass check valve opens to provide communication between the liquid fuel control valve and the gaseous fuel passage.

In any one or more of the embodiments described above, the cavity may further include an upper chamber connected to the gaseous fuel inlet and in communication with the liquid fuel control valve. The needle control valve may include at least one helical slot disposed along the needle control valve to promote mixing of the liquid and gaseous fuels in the cavity. In a further refinement of this concept, the at least one helical slot may be disposed along the needle control valve adjacent to the upper chamber so gaseous and liquid fuels entering the upper chamber engage the at least one helical slot.

DETAILED DESCRIPTION

In this disclosure "gaseous fuel" is broadly defined as any combustible fuel that is in the gaseous phase at atmospheric pressure and ambient temperature.

Figure 1:
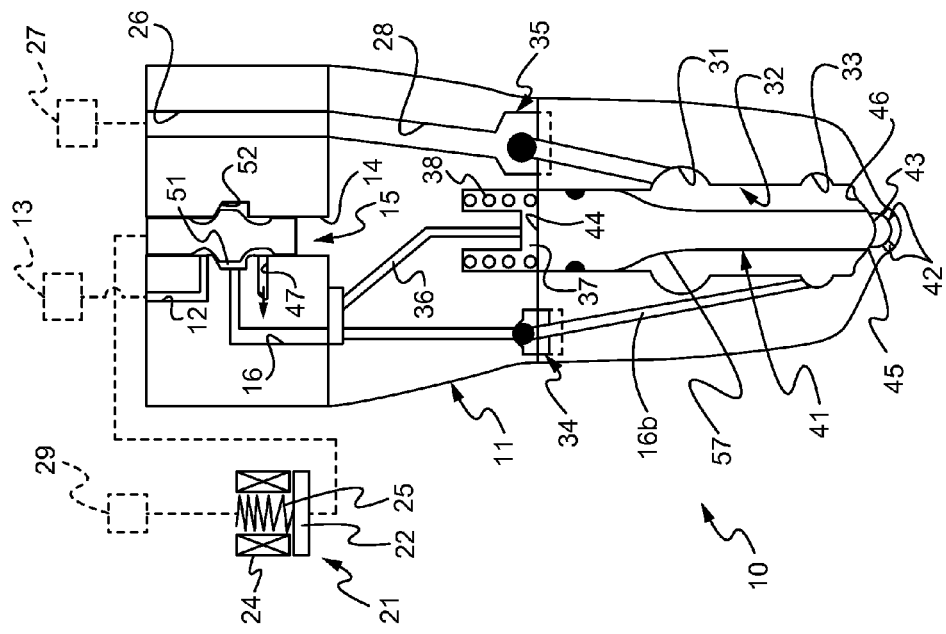
FIG. 1 is a partial sectional and schematic view of a disclosed fuel injector with the liquid fuel control valve in an open position, the liquid fuel check valve in an open position, the gaseous fuel check valve in a closed position and the needle control valve in a closed position thereby illustrating the fuel injector as the cavity is loaded with liquid fuel.

Referring now to FIG. 1, an electronically actuated fuel injector 10 includes an injector body 11 that contains various moving components positioned as they would be prior to initiation of an injection event. The injector body 11 includes a liquid fuel inlet 12 that receives liquid fuel from a liquid fuel supply 13, such as a fuel rail, that may also include a pump (not shown) for delivering the liquid fuel to the liquid fuel inlet 12 at a predetermined pressure. For example, the liquid fuel, which may be diesel fuel, may be delivered through the liquid fuel inlet 12 at a pressure of about 40 MPa (5,802 psi), although the inlet pressure for the liquid fuel may vary widely, e.g., from about 30 MPa (4,341 psi) to about 50 MPa (7,252 psi). Thus, the liquid fuel supply 13 may include a reservoir (not shown) as well as a pump (not shown) or other means for delivering the liquid fuel to the liquid fuel inlet 12 at a desired pressure.

Figure 2:
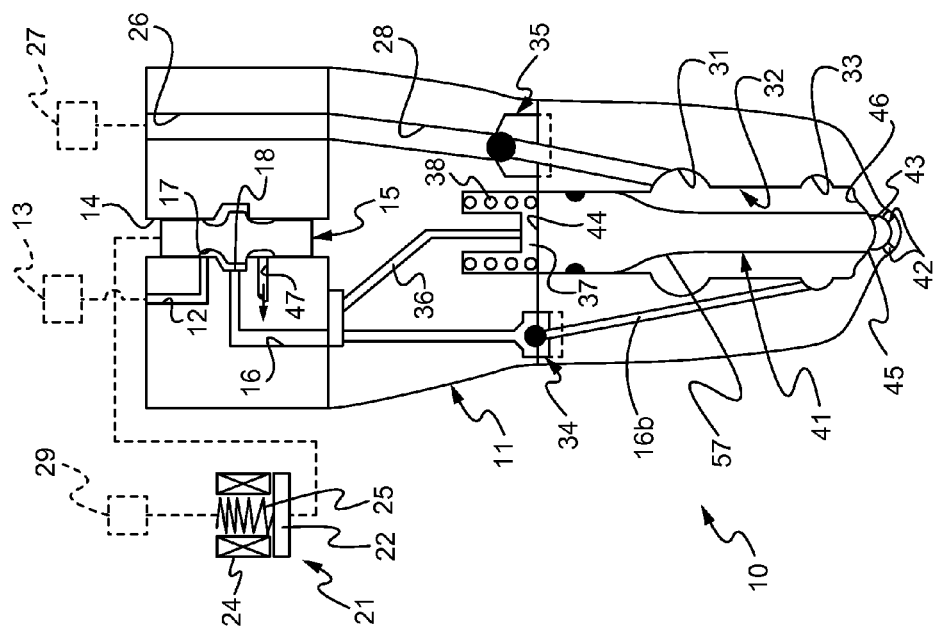
FIG. 2 is a partial sectional and schematic view of the fuel injector disclosed in FIG. 1, but with the liquid fuel control valve in a closed position, the liquid fuel check valve in a closed position, the gaseous fuel check valve in an open position and the needle control valve in an open position thereby illustrating the fuel injector as the cavity is loaded with gaseous fuel, after the cavity has been loaded with liquid fuel and during an injection event.

The injector body 11 also includes a liquid fuel check valve cavity 14 which accommodates a liquid fuel control valve 15. The liquid fuel control valve 15 is shown in an open position in FIG. 1 whereby communication between the liquid fuel inlet 12 and the liquid fuel passages 16a, 16b is provided by way of the recess 17 disposed in the liquid fuel control valve 15 and the recess 18 disposed in the injector body 11. The liquid fuel control valve 15 may be coupled to a solenoid assembly 21 which may, for example, may include an armature 22, a coil 24 and a spring 25. The solenoid assembly 21 may also be linked to an electrical supply 29 for activating the coil 24, which causes the armature 22 to upwards against the bias of the spring 25 and pulling the liquid fuel control valve 15 upwards from the open or liquid fuel loading position shown in FIG. 1 to the closed or gaseous fuel loading position shown in FIG. 2. In FIG. 1, no current is being supplied to the solenoid assembly 21; the spring 25 is relaxed and the armature 22 has pushed the liquid fuel control valve 15 to the open position. In FIG. 2, current is being supplied to the solenoid assembly 21, the spring 25 is compressed and the armature 22 has pulled the liquid fuel control valve 15 to the closed position.

Returning to FIG. 1, the injector body 11 may also include a gaseous fuel inlet 26 which receives gaseous fuel from the gaseous fuel supply 27. The gaseous fuel supply 27 may be a pressurized supply or reservoir of gaseous fuel, which may be in a liquid or supercritical state, and which may also include a pump (not shown) for delivering the gaseous fuel to the gaseous fuel inlet at a desired pressure. In an embodiment, the gaseous fuel is delivered to the gaseous fuel inlet 26 at a lower pressure than the liquid fuel is delivered to the liquid fuel inlet 12. One exemplary pressure for the gaseous fuel is about 25 MPa (3,626 psi), but the gaseous fuel inlet 26 pressure may vary from about 15 MPa (2,176 psi) to about 35 MPa (5,076 psi). The gaseous fuel inlet 26 may be connected to a gaseous fuel passage 28 which leads to an upper chamber 31 of the needle control valve cavity 32. The needle control valve cavity 32 may also include a lower chamber 33 that may be coupled to or in communication with the liquid fuel passages 16a 16b while the upper chamber 31 is connected to or in communication with the gaseous fuel passage 28.

The liquid fuel passages 16a, 16b include a liquid fuel check valve 34 while the gaseous fuel passage 28 includes a gaseous fuel check valve 35. With the liquid fuel control valve 15 in the open position or liquid-loading position as shown in FIG. 1, liquid fuel is being delivered from the liquid fuel supply 13, through the liquid fuel inlet 12, past the liquid fuel control valve 15, through the liquid fuel passage 16a, past the liquid fuel check valve 34, through the passage 16b and to the lower chamber 33 of the needle control valve cavity 32.

Liquid fuel is also communicated through the liquid fuel flow passage 36 which is connected to or in communication with the biasing chamber 37. The biasing chamber 37 may also include a biasing spring 38. Pressure provided to the biasing chamber 37 by way of the pressurized liquid fuel passing through the liquid fuel flow passage 36 in combination with the biasing force of the biasing spring 38 biases the needle control valve 41 towards the closed position as shown in FIG. 1 (and FIGS. 3 and 5) or towards the nozzle outlets 42. The needle control valve 41 may include a distal end 43 and a proximal end 44. The distal end 43 of the needle control valve 41 may also include a closing surface 45 that engages a seat 46 formed in the needle control valve cavity 32 adjacent to the nozzle outlets 42. Engagement of the closing surface 45 and the seat 46 isolates the nozzle outlets 42 from the liquid and gaseous fuels disposed in the needle control valve cavity 32 prior to an injection event. FIG. 1 also illustrates a drain 47, the function of which will be described in greater detail in connection with FIG. 2.

Referring now to FIG. 2, current has been supplied to the solenoid assembly 21 the armature 22 and liquid fuel control valve 15 have been drawn upward to move the liquid fuel control valve 15 to the closed position. In the closed position, the sealing surface 51 of the liquid fuel control valve 15 has engaged the conical valve seat 52 of the liquid fuel check valve cavity 14 thereby shutting off flow between the liquid fuel inlet 12 and the liquid fuel passages 16a, 16b.

For an injection event, the liquid and gaseous fuels may be supplied to the needle control valve cavity 32 in the following manner. First, with the liquid fuel control valve 15 in the open position as shown in FIG. 1 and no current is being supplied to the solenoid assembly 21 via the electrical supply 29, liquid fuel is supplied through the liquid fuel inlet 12 via the liquid fuel supply 13. Liquid fuel proceeds through the liquid fuel inlet 12, past the liquid fuel control valve 15 and into the liquid fuel passage 16a as well as the liquid fuel flow passage 36. At this point, the liquid fuel is pressurized, with one exemplary pressure being about 40 MPa. The pressurized liquid fuel proceeds down the liquid fuel passage 16a, into the liquid fuel flow passage 36 and into the biasing chamber 37. The pressurized fuel in the biasing chamber 37, in combination with the biasing spring 38, maintains the needle control valve 41 in the closed position as shown in FIG. 1. Still referring to FIG. 1, pressurized liquid fuel also overcomes the bias of the liquid fuel check valve 34 before it arrives in the lower chamber 33 of the needle control valve cavity 32. As the pressurized liquid fuel enters the chamber 33, pressure in the cavity 32 builds and the gaseous fuel check valve is closed. Liquid fuel continues to enter the lower chamber 33 of the cavity 32 until it reaches a static pressure balance with gas remaining in the cavity 32 after the previous injection event.

The amount of liquid fuel delivered to the cavity 32 may be manipulated by manipulating the pressure differential between the liquid and gaseous fuels. Specifically, if ΔP equals the pressure of the liquid fuel $P_L$ minus the pressure of the gaseous fuel $P_G$, increasing ΔP increases the amount of liquid fuel delivered to the cavity 32 and decreasing ΔP decreases the amount of liquid fuel delivered to the cavity 32.

After the lower chamber 33 of the needle control valve cavity 32 is charged with liquid fuel, current is supplied to the solenoid assembly 21 and the liquid fuel control valve 15 is closed or moved upwards to the gas-loading position, as discussed above and as shown in FIG. 2. Closure of the liquid fuel control valve 15 reduces the pressure in the liquid fuel passage 16a and the liquid fuel flow passage 36 by exposing both passages to the drain 47 as shown in FIG. 2. As pressure behind the check valve 34 and the biasing chamber 37 is dumped through the drain 47, the check valve 34 closes and the needle control valve 41 opens, which further reduces pressure in the needle control valve cavity 32 and which opens the gaseous fuel check valve 35. Gaseous fuel proceeds through the passage 28, past the check valve 34 and into the upper chamber 31 of the needle control valve cavity 32 as the injection event begins.

As current continues to flow through the coil 24, the liquid fuel control valve 15 is maintained in the closed or gas-loading position shown in FIG. 2 and gaseous fuel continues to enter the cavity 32. In the closed or gas-loading position of FIG. 2, the reader will note that the exposure of the liquid fuel flow passage 36 to the drain 47 reduces the pressure in the biasing chamber 37. With the reduced pressure in the biasing chamber 37, gaseous fuel disposed in the upper chamber 31 of the needle control valve cavity 32 acts on the lifting hydraulic surface 57 causing the needle control valve 41 to move upward against the bias of the spring 38 thereby opening the needle control valve 41 for an injection event. At this point, the gaseous fuel check valve 35 is opened and pressurized liquid and gaseous fuels in the needle control valve cavity 32 exit the fuel injector 10 via the nozzle outlets 42.

The amount of gaseous fuel delivered to the cylinder during an injection event may be manipulated by controlling the duration of the time that the solenoid assembly 21 is energized. Increasing the time of the coil 24 is energized increases the amount of gas delivered during an injection event; decreasing the time the coil 24 is energized decreases the amount of gas delivered during an injection event.

An injection event is stopped when the coil 24 is de-energized. The armature 22 moves upward as the spring 25 retracts towards its relaxed position and the liquid fuel control valve 15 is returned to the closed position shown in FIG. 1. With the liquid fuel check valve 34 still closed, pressure builds in the biasing cavity 37 which, in combination with the spring 38, closes the needle control valve 41. Closure of the needle control valve 41 is followed by opening of the liquid fuel check valve 34 as pressure builds in the passage 16a. The passages 16a, 16b and 36 may be designed with appropriate restrictions and clearances to ensure that the needle control valve 41 closes before the liquid fuel check valve 34 opens so no liquid fuel is delivered at the end of an injection event. The liquid fuel is intended to serve as a pilot or igniter fuel for the gaseous fuel as gaseous fuels tend to knock when compressed and ignited by conventional diesel engines.

As liquid fuel is recharged into the chamber 33 of the cavity 32, pressure in the cavity 32 builds and the gaseous fuel check valve 35 is closed. Liquid and gaseous fuels are sequentially re-supplied to the needle control valve cavity 32 as described above.

Figure 3:
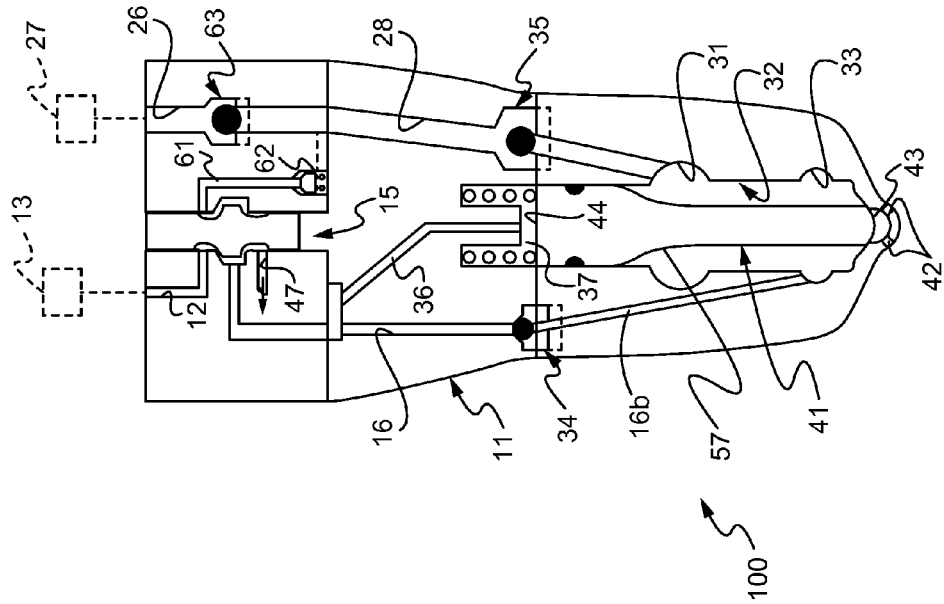
FIG. 3 is a partial sectional view of another disclosed fuel injector with the liquid fuel control valve in an open position, the liquid fuel check valve in an open position, the gaseous fuel check valve in a closed position and the needle control valve in a closed position as in FIG. 1, thereby illustrating the fuel injector as the cavity is loaded with liquid fuel and further illustrating a bypass passage that links the liquid fuel source with the gaseous fuel source for use when the gaseous fuel source supply is interrupted or is supplied at an insufficient pressure.
Figure 4:
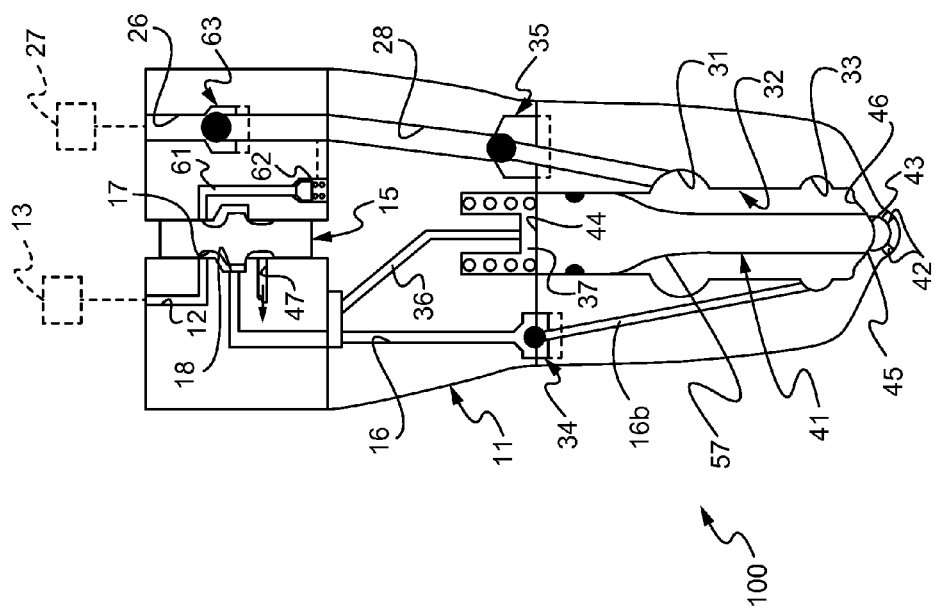
FIG. 4 is a partial sectional view of the fuel injector shown in FIG. 3 with the liquid fuel control valve in a closed position, the liquid fuel check valve in a closed position, the gaseous fuel check valve in an open position and the needle control valve in an opern position thereby illustrating the fuel injector as the cavity is loaded with gaseous fuel, after the cavity has been loaded with liquid fuel and during an injection event.

Turning to FIGS. 3 and 4, a fuel injector 100 is shown with a liquid fuel bypass passage 61. The passage 61 supplies liquid fuel to the gaseous fuel passage 28 when the supply of gaseous fuel is interrupted or depleted or if the gaseous fuel supply experiences low pressure, which may be the case in the event of a cold weather start. In the embodiment shown in FIGS. 3 and 4, liquid fuel is used as a substitute for the depleted gaseous fuel, which enables the operator to get the equipment back to the home base or to a gaseous fuel supply station.

The liquid fuel bypass passage 61 includes a bypass check valve 62 that remains closed as long as there is pressure in the gaseous fuel passage 28. The gaseous fuel passage 28 is equipped with an additional check valve 63. When the supply 27 of gaseous fuel is interrupted or the gaseous fuel supply 27 becomes depleted, pressure in the gaseous fuel passages 26, 28 will drop causing the bypass check valve 62 to open as shown in FIG. 4. In the open position shown in FIG. 4, and with the liquid fuel control valve 15 moved to the closed position, the liquid fuel inlet 12 is in communication with the liquid fuel bypass passage 61 thereby supplying liquid fuel to the passage 28. The presence of the pressurized liquid fuel in the passage 28 opens the check valve 35 and permits liquid fuel to enter the upper chamber 31 of the needle control valve cavity 32. Thus, even if the supply of gaseous fuel is interrupted, a sufficient amount of liquid fuel is supplied through both passages 28 and 16 for a suitable injection event. Again, the fuel injector 100 of FIGS. 3-4 is useful for cold starting conditions where the pressure of the gaseous fuel may be low or in situations where the gaseous fuel supply is depleted and the liquid fuel (e.g. diesel) is needed to transport the vehicle back to the home base or to a gaseous fuel supply station.

Figure 5:
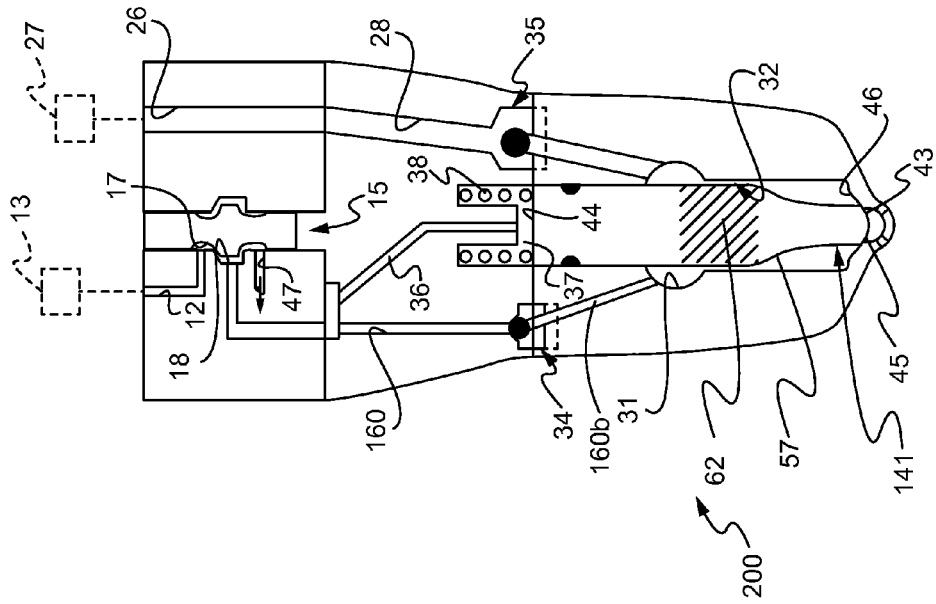
FIG. 5 is a partial sectional view of another disclosed fuel injector with the liquid fuel control valve in an open position, the liquid fuel check valve in an open position, the gaseous fuel check valve in a closed position and the needle control valve in a closed position as in FIGS. 1 and 3 thereby illustrating the fuel injector as liquid fuel is loaded into the need control valve cavity and further illustrating the use of helical slots on the needle control valve for mixing liquid and gaseous fuels that are delivered sequentially to the upper chamber of the needle control valve cavity.
Figure 6:
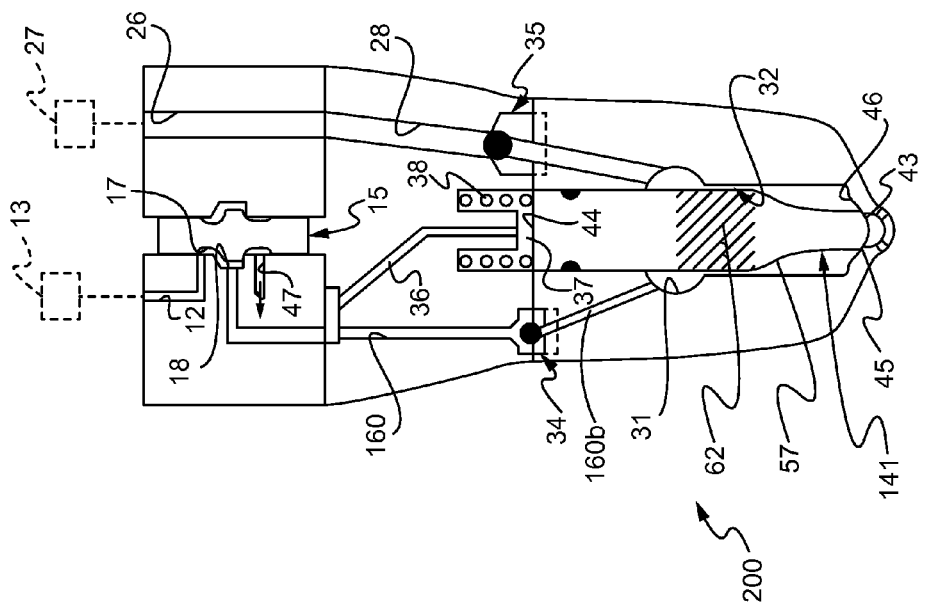
FIG. 6 is another partial sectional view of the fuel injector shown in FIG. 5 with the liquid fuel check valve in a closed position, the liquid fuel check valve in a closed position, the gaseous fuel check valve in an open position and the needle control valve in an open position thereby illustrating the fuel injector as the cavity is loaded with gaseous fuel, after the cavity has been loaded with liquid fuel and during an injection event.

Turning to FIGS. 5 and 6, yet another fuel injector 200 is disclosed whereby the liquid fuel passages 160a, 160b are routed to deliver liquid fuel to the upper chamber 31 of the needle control valve cavity 32. The gaseous fuel passage 28 is still routed to deliver fuel to the upper chamber 31 as well. To enhance mixing of the liquid and gaseous fuels, one or more helical slots 64 are provided around a mid section of the needle control valve 141. The enhanced mixing provided by the helical slots 64 provides for an improved atomization of the liquid fuel.

INDUSTRIAL APPLICABILITY

Improved fuel injectors are disclosed that are capable of simultaneously delivering liquid and gaseous fuels to the combustion chamber of a compression ignition engine, although the liquid and gaseous fuels are sequentially and separately delivered to the needle control valve cavity. For example, fuel injectors are disclosed that can deliver liquid diesel fuel, as a pilot liquid, along with a gaseous fuel, such as natural gas or other available fuels that are gases at atmospheric pressure and ambient temperature. The fuels are delivered to the needle control valve cavity via separate passageways. The delivery of the pressurized liquid fuel followed by the delivery of gaseous fuel is actuated by a single actuator that is provided for each fuel injector. The actuator may be of a solenoid type or of a piezoelectric type or other suitable actuator as will be apparent to those skilled in the art. A liquid fuel control valve, in combination with the actuator and a liquid fuel check valve, controls the delivery of the pilot liquid fuel to the needle control valve cavity.

With the liquid fuel control valve open or in a liquid fuel-loading position, liquid fuel is charged to the needle control valve cavity past an open liquid fuel check valve and a gaseous fuel check valve is closed (which also serves to shut off the supply of gaseous fuel after an injection event). After the liquid fuel in the needle control valve cavity reaches a static pressure balance with the gas remaining in the cavity after a previous injection event, current supplied to the actuator cuts off the supply of liquid fuel to the liquid fuel passage and the liquid fuel control valve is closed. Reduced pressure in the passage upstream of the liquid fuel check valve and the biasing cavity causes the liquid fuel check valve to close and the needle control valve to open. Decreased pressure in the needle control valve cavity as a result of the needle control valve opening causes the gaseous fuel check valve to open. The gaseous fuel may be supplied through the gaseous fuel check valve at a lower pressure than the liquid fuel and is supplied to the fuel injector without requiring a separate actuator. As the needle control valve opens, both the liquid and gaseous fuels in the needle control valve cavity are injected into a combustion chamber. Thus, liquid and gaseous fuel are delivered to the needle control valve cavity sequentially but are injected into a combustion chamber simultaneously. At the conclusion of the injection event, with the liquid fuel control valve open as the current to the actuator is cut off, the needle control valve closes first, followed by the opening of the liquid fuel check valve and the sequence is begun again.

The disclosed fuel injectors deliver both liquid and gaseous fuels to a combustion chamber using a single actuator. The disclosed designs are simple and include a reduced number of parts as compared to competing designs, resulting in reduced costs and improved packaging. A single control valve is used to deliver the pilot liquid fuel to the needle control valve cavity.

The quantity of liquid pilot fuel delivered to the needle control valve cavity may be proportional to the pressure differential between the liquid (e.g. 40 MPa) and gaseous (e.g. 25 MPa) fuel rails and therefore may be manipulated by manipulating $\Delta P$ (=$P_L$—$P_G$; as $\Delta P$ increases, the amount of liquid fuel delivered increases; as $\Delta P$ decreases, the amount of liquid fuel delivered decreases). For a solenoid-type actuator, the amount of gaseous fuel delivered may be manipulated by manipulating the duration of the current supply to the actuator, i.e., increasing the time of energization increases the amount of gas delivered; decreasing the time of energization decreases the amount of gas delivered. Of course, a solenoid actuator may be designed to operate in an opposite manner like a piezoelectric actuator, and therefore an inverse relationship between the energization duration and the amount of gaseous fuel delivered could apply (i.e., decreasing the time of energization increases the amount of gas delivered; increasing the time of energization decreases the amount of gas delivered).

In the event the gas supply is interrupted, an additional check valve in the gaseous fuel passage combined with a liquid fuel bypass passage and a bypass check valve enables liquid fuel to be delivered through both the liquid fuel passage and gaseous fuel passage to the needle control valve cavity. This "limp home" feature is advantageous when the gaseous fuel supply is interrupted or unavailable, or during cold starting conditions when the pressure of the gaseous fuel may be insufficient. To reset the bypass valve once gas is re-introduced, the pressure differential may need to be minimized for a period of time to allow gas to begin flowing to the nozzle again.

The liquid and gaseous fuels may also be premixed in the needle control valve cavity by placing helical slots around the needle control valve which will increase the turbulence in the needle control valve cavity as the liquid and gaseous fuels enter the cavity. The liquid fuel may also be injected into the needle control valve cavity at a point that is adjacent to the point where the gaseous fuel is injected into the needle control valve cavity or at an elevated position for increased turbulence and improved mixing.

Finally, it will also be noted that the second fluid, i.e., the gaseous fuel, may also be a second liquid fuel that is supplied at a lower pressure than the pilot liquid fuel. Hence, fuels that are lighter than diesel may be substituted for the gaseous fuel.

What is claimed is:

1. A fuel injector comprising:
  an injector body defining a liquid fuel inlet, a gaseous fuel inlet and a nozzle outlet;
    a needle control valve disposed within a cavity formed in the injector body, the needle control valve including a proximal end and a distal end, the distal end being disposed adjacent to the nozzle outlet, the distal end including a valve seat for releasably engaging the closing surface and for releasably sealing the nozzle outlet;
    a liquid fuel control valve disposed within the injector body and providing selective communication between the liquid fuel inlet and a first liquid fuel passage;
    a liquid fuel check valve disposed within the injector body, the liquid fuel check valve in selective communication with the liquid fuel inlet and the liquid fuel control valve via the first liquid fuel passage that extends from the liquid fuel control valve through the injector body and to the liquid fuel check valve and the liquid fuel check valve in selective communication with the cavity via a second liquid fuel passage that extends from the liquid fuel check valve through the injector body to the cavity;
    an actuator for moving the liquid fuel check valve between an open position where the liquid fuel check valve provides communication between the liquid fuel inlet and the cavity and a closed position where the liquid fuel check valve isolates the liquid fuel inlet from the cavity;
    the gaseous fuel inlet in communication with the cavity.

2. The fuel injector of claim 1 wherein the cavity further includes an upper chamber connected to the gaseous fuel inlet and a lower chamber in communication with the liquid fuel check valve, the lower chamber being disposed between the nozzle outlet and the upper chamber.

3. The fuel injector of claim 1 wherein the liquid fuel is supplied at a higher pressure than the gaseous fuel.

4. The fuel injector of claim 1 wherein the liquid and gaseous fuels are isolated from one another until they reach the cavity.

5. The fuel injector of claim 1 wherein the actuator includes a solenoid assembly.

6. The fuel injector of claim 1 wherein the actuator includes a piezoelectric actuator.

7. The fuel injector of claim 1 wherein the first liquid fuel passage also being connected to a liquid fuel flow passage,
  the cavity extending between the nozzle outlet and a biasing chamber with the distal end of the needle control valve facing the nozzle outlet and the proximal end of the needle control valve facing the biasing chamber, the biasing chamber being in communication with the liquid fuel flow passage for biasing the needle control valve towards the nozzle outlet.

8. The fuel injector of claim 7 wherein the biasing chamber also accommodates a needle control valve spring that biases the needle control valve towards the nozzle outlet.

9. The fuel injector of claim 1 wherein a gaseous fuel passage connects the gaseous fuel inlet to the cavity,
the liquid fuel check valve is also connected to a liquid fuel bypass passage, the liquid fuel bypass passage connecting the liquid fuel check valve to the gaseous fuel passage with a bypass check valve disposed in the liquid fuel bypass passage, the bypass check valve being biased towards a closed position that isolates the liquid fuel check valve from the gaseous fuel passage,
wherein, if a pressure in the gaseous fuel passage drops below a predetermined level, the bypass check valve opens to provide communication between the liquid fuel check valve and the gaseous fuel passage.

10. The fuel injector of claim 1 wherein the needle control valve includes at least one helical slot disposed along the needle control valve to promote mixing of the liquid and gaseous fuels in the cavity.

11. The fuel injector of claim 1 wherein a ratio of liquid fuel to gaseous fuel delivered to the cavity is proportional to a difference in the pressure of the liquid fuel at the liquid fuel inlet and the gaseous fuel at the gaseous fuel inlet.

12. A fuel injector comprising:
an injector body defining a liquid fuel inlet, a gaseous fuel inlet, a drain, a nozzle outlet, a liquid fuel control valve cavity, first and second liquid fuel passages with a liquid fuel check valve disposed between the first and second liquid fuel passages, a gaseous fuel passage and a needle control valve cavity;
a liquid fuel control valve disposed within the liquid fuel control valve cavity and in selective communication with the liquid fuel inlet, the first liquid fuel passage and the drain, the liquid fuel control valve being movable between a closed position where the liquid fuel inlet and the first liquid fuel passage are isolated from the liquid fuel control valve cavity and the drain is in communication with the liquid fuel control valve cavity, and an open position where the liquid fuel inlet is in communication with the first liquid fuel passage through the liquid fuel control valve cavity and the drain is isolated from the liquid fuel check valve cavity;
the liquid fuel check valve cavity selectively connected to the needle control valve cavity by the first and second liquid fuel passages and the liquid fuel check valve, the liquid fuel check valve and first and second liquid fuel passages being disposed within the injector body;
the gaseous fuel inlet connected to the needle control valve cavity by a gaseous fuel passage, the gaseous fuel passage including a gaseous fuel check valve that closes the gaseous fuel passage when the liquid fuel check valve is in the closed position;
a needle control valve disposed within the needle control valve cavity, the needle control valve including a distal end disposed adjacent to the nozzle outlet and a proximal end, the distal end including a closing surface, the needle control valve cavity including a valve seat for releasably engaging the closing surface for releasably sealing the nozzle outlet;
an actuator for moving the liquid fuel check valve between the open and closed positions.

13. The fuel injector of claim 12 wherein the cavity further includes an upper chamber connected to the gaseous fuel passage and a lower chamber in communication with the second liquid fuel passage, the lower chamber being disposed between the nozzle outlet and the upper chamber.

14. The fuel injector of claim 12 wherein the liquid fuel is supplied at a higher pressure than the gaseous fuel, and
wherein a ratio of liquid fuel to gaseous fuel delivered to the cavity is proportional to a difference in the pressure of the liquid fuel at the liquid fuel inlet and the gaseous fuel at the gaseous fuel inlet.

15. The fuel injector of claim 12 wherein the liquid and gaseous fuels are isolated from one another until they reach the needle control valve cavity.

16. The fuel injector of claim 12 wherein the actuator includes a solenoid assembly.

17. The fuel injector of claim 12 wherein the actuator includes a piezoelectric actuator.

18. The fuel injector of claim 12 wherein the liquid fuel passage is also connected to a liquid fuel flow passage,
the needle control valve cavity extending between the nozzle outlet and a biasing chamber with the distal end of the needle control valve facing the nozzle outlet and the proximal end of the needle control valve facing the biasing chamber, the biasing chamber being in communication with the liquid fuel flow passage for biasing the needle control valve towards the nozzle outlet,
the biasing chamber also accommodating a needle control spring that biases the needle control valve towards the nozzle outlet.

19. The fuel injector of claim 1 wherein the liquid fuel control valve is also connected to a liquid fuel bypass passage, the liquid fuel bypass passage connecting the liquid fuel control valve cavity to the gaseous fuel passage with a bypass check valve disposed in the liquid fuel bypass passage, the bypass check valve being biased towards a closed position that isolates the liquid fuel control valve cavity from the gaseous fuel passage,
wherein, if a pressure in the gaseous fuel passage drops below a predetermined level, the bypass check valve opens to provide communication between the liquid fuel control valve and the gaseous fuel passage.

20. A method of delivering a liquid fuel and a gaseous fuel to a combustion chamber using a single fuel injector with a single actuator, the method comprising:
providing a fuel injector including an injector body defining a liquid fuel inlet, a gaseous fuel inlet and a nozzle outlet, the fuel injector further including a needle control valve disposed within a cavity formed in the injector body, the cavity including a nozzle outlet at one end and a biasing chamber at the other end with the needle control valve disposed therebetween, the needle control valve including a closing surface disposed at a distal end of the needle control valve that faces the nozzle outlet for releasably sealing the nozzle outlet, the needle control valve also including a proximal end facing the biasing chamber, the fuel injector further including a liquid fuel control valve disposed within the injector body and in selective communication with the liquid fuel inlet and the cavity by way of first and second liquid fuel passages with a liquid fuel check valve disposed between the first and second liquid fuel passages, the first liquid fuel passage being connected to a liquid fuel flow passage, the liquid fuel flow passage being in communication with the biasing chamber, the fuel injector also including an actuator for moving the liquid fuel control valve between an open position where the liquid fuel control valve provides communication between the liquid fuel inlet, the first liquid fuel passage and the liquid fuel flow passage and a closed position where the liquid fuel control valve isolates the liquid fuel inlet from the first liquid fuel passage and the liquid fuel flow passage, the gaseous fuel inlet being in communication with the cavity through a gaseous fuel passage, the liquid fuel control valve closing the first liquid fuel passage when the liquid fuel control valve is closed thereby providing communication between the first liquid fuel passage, the liquid fuel flow passage and the drain, the gaseous fuel passage including a gaseous fuel check valve that closes when a pressure in the cavity rises above a predetermined level after the liquid fuel control valve is closed;

delivering liquid fuel past the liquid fuel control valve, through the first liquid fuel passage, past the liquid fuel check valve, through the second liquid fuel passage and to the cavity and delivering gaseous fuel past the gaseous fuel check valve and to the cavity when the liquid fuel control valve is in the open position;

actuating the actuator to close the liquid fuel control valve thereby providing communication between the drain, the first and second liquid fuel passages and the liquid fuel flow passage thereby closing the liquid fuel control valve, reducing pressure in the biasing chamber thereby lifting the closing surface of the needle control valve off of the nozzle outlet and closing the gaseous fuel check valve.

\* \* \* \* \*